United States Patent Office 3,228,887
Patented Jan. 11, 1966

3,228,887
VAPOR PHASE OXIDATION OF TITANIUM TETRA-
CHLORIDE, TETRABROMIDE, OR TETRAIODIDE
IN THE PRESENCE OF A THORIUM SOURCE
Arthur Wallace Evans, Nunthorpe, Middlesbrough, and
Kenneth Arkless, Eaglescliffe, England, assignors to
British Titan Products Company Limited, Billingham,
England, a corporation of the United Kingdom
No Drawing. Filed Apr. 23, 1963, Ser. No. 274,939
Claims priority, application Great Britain, Apr. 25, 1962,
15,755/62
10 Claims. (Cl. 252—301.1)

The present invention relates to an improved process for the production of titanium dioxide by the vapor phase oxidation of a titanium tetrahalide, and to the pigmentary product.

The oxidation of titanium tetrahalides, particularly titanium tetrachloride, by an oxidizing gas has been previously described, for example in British patent specification No. 761,770.

For certain purposes, it may be desired to produce titanium dioxide particles of limited median weight crystal size, for example below that normal for pigments. Such particles can be used for nuclei in a further oxidation reaction.

Our copending U.S. patent application Serial No. 254,007 describes a particular use for such particles of limited size wherein one starts with particles of a limited size (e.g. 0.01 to 0.25 micron) and grows them to a larger size.

(The medium weight crystal size is that particle size wherein 50% by weight of the particles have a diameter beneath this value and 50% by weight of the particles have a diameter above this value.)

It is an object of the present invention to provide a process for the oxidation of a titanium tetrahalide in the vapor phase wherein the titanium dioxide particles produced are of limited size.

Accordingly, the present invention comprises oxidizing a titanium tetrahalide to titanium dioxide in the vapor phase, in the presence of a source of thorium. It has been found that the presence of a source of thorium produces small product particles.

The oxidation may be carried out by introducing the titanium tetrahalide and the oxidizing gas into an empty reactor through a burner, wherein the temperature of the reaction is maintained by supplying heat from an external source such as pre-heating the reactants before mixing, or by burning a fuel within the reaction chamber.

Alternatively, the oxidation may be carried out in a reactor wherein the reaction zone has a fluidized bed of inert particles. A considerable part of the heat of reaction is retained in these particles and serves to heat the incoming reactants so that the reaction can if desired be maintained autothermally.

The titanium tetrahalide is preferably titanium tetrachloride, and is a preferably introduced into the reactor as a vapor. The tetrafluoride is unsuitable for use in the present invention and the term "tetrahalide" as used herein does not include the tetrafluoride.

The oxidation is preferably carried out by mixing the tetrahalide with oxygen at a suitable temperature. The oxygen may be in the form of a mixture with an inert gas, if desired, for example air or oxygen-enriched air.

The source of thorium is most conveniently a salt of the element, particularly a salt which is water soluble and/or which possesses appreciable vapor pressure at a moderate temperature, for example at a temperature below about 1,000° C. and preferably below about 800° C.

Water-soluble compounds of thorium are particularly suitable for use in the process when the latter is carried out in a fluidizied bed, whereas compounds of thorium which can be converted to a vapor are particularly suitable for use in a process wherein the reactants are introduced into an empty reactor through a burner.

Thorium tetrachloride has been found to be particularly suitable for both processes since it is water-soluble and it sublimes at a temperature within the range of about 720° to 750° C. Examples of other compounds which may be used are the sulfates, phosphates, carbonates, nitrates and oxalates of thorium. Also envisaged for use in the process of the present invention are thorium oxide, thorium hydroxide, thorium, sulfide and thorium platinocyanide.

Where the process is carried out in a fluidized bed, the source of thorium may be introduced as a solid or in solution, for example in an aqueous solution. One method is to slurry the particulate bed material with a solution of the source of thorium and to dry the resulting slurry before using the material in the bed. Alternatively, the source of thorium may be in a form suitable for use as a proportion of the particulate material of the bed, for example the bed may contain a proportion of thorium dioxide of a suitable particle size.

Where the process is carried out with the continuous or intermittent removal of bed particles enlarged by accretion and their replacement by smaller particles, the latter can be mixed with the required amount of a solid source of thorium before introduction into the bed.

If the thorium source is added to the bed batchwise, sufficient of the source may suitably be added to give a concentration of thorium in the bed in the range of 0.01% to 5%, preferably in the range of 0.5% to 2%, based upon the weight of the fluidized bed. When continuous additions of the source are made to the bed, or when the process is carried out by introducing the reactants into the reaction chamber through a burner, it is preferred to base the amount of thorium added upon the amount of titanium dioxide produced, and under these circumstances sufficient of the compound containing the thorium may be added to give a theoretical concentration of thorium in the titanium dioxide produced of from 0.001% to 10%, preferably from 0.01% to 1.0%, by weight of such titanium dioxide.

Where the process is carried out in fluidized bed, the bed is normally maintained in the fluidized state by passing the reactants into the bed at suitable flow rates. If desired, however, other gases can be introduced into the bed to assist fluidization. When the oxidizing gas is air, the nitrogen in the air may act as such other gas. The introduction of such gas may, however, cause difficulty in the recovery of the halogen, for example chlorine, liberated during the oxidation.

The fluidized bed should normally be maintained at a temperature in the range of 800° C. to 1400° C., preferably 900° C. to 1100° C., during the present process.

Where the fluidized bed process is carried out on a large scale, for example in a well-lagged reactor having an internal diameter greater than about 18", the heat losses may be so small that the heat of reaction from the oxidation of the titanium tetrahalide will maintain the desired bed temperature and the process will be autothermal. When the heat losses are too great, for example when the process is carried out on a smaller scale, it may be necessary to supply heat from an outside source. This may be provided by electrical heating, by pre-heating one or more of the gases introduced into the fluidized bed, or by burning a fuel, for example carbon monoxide, in the bed. In the latter case sufficient oxidizing gas must be introduced to burn the fuel in addition to oxidizing the titanium tetrahalide to titanium dioxide.

The particulate material forming the fluidized bed may be any material of suitable particle size which does not adversely affect the oxidation of the titanium tetrahalide. A preferred particle size is one in the range 50 to 2,000 microns, particularly 100 to 1,000 microns. Materials such as silica, zircon, alumina, zirconia, titanium dioxide or mixtures thereof may be used, or alternatively a material or a proportion of material may be used in the bed which contains a source of thorium as required by the present invention, for example material containing thorium dioxide, as previously mentioned.

In addition to the titanium tetrahalide, the oxidizing gas and the source of thorium, minor proportions of other gases or vapors may be introduced into the reactor during the reaction. Such other substances may include rutilizing agents, such as aluminum halides, zirconium tetrahalides and water vapor, and other titanium dioxide crystal-modifying agents such as silicon halides (for example silicon tetrachloride), antimony halides (for example antimony pentachloride) and phosphorus halides (for example phosphorous trichloride). In particular, it may be advantageous to introduce a small quantity of an aluminum halide and a silicon halide, if the process is carried out in a fluidized bed, in order to provide a softer accretion of titanium dioxide on the bed particles as described in our co-pending U.S. patent application Serial No. 126,310.

The titanium dioxide produced and entrained in the effluent gases may be recovered, if desired, in a known manner. However, the effluent gases carrying the titanium dioxide particles (which are generally smaller than those produced in the absence of thorium) are particularly suitable for use in the process described in our co-pending U. S. patent application Serial No. 254,007. For this purpose the effluent gases containing the titanium dioxide particles may be passed directly through a second reaction zone into which at least two additional introductions of titanium tetrahalide and/or oxidizing gas (and preferably more) are made as the gas stream and the entrained titanium dioxide particles pass through it.

It is believed that under these latter circumstances the existing titanium dioxide particles act as nuclei upon which is deposited the titanium dioxide formed from the oxidation of the titanium tetrahalide in the second reaction zone. The titanium dioxide particles introduced into the second reaction zone thus grow in size to the optimum pigment particle size and also appear to be converted to pigment particles having a smaller size *range* than has been obtainable hitherto (i.e. the final product has a more uniform particle size).

It is preferred that the temperature of the effluent gases and titanium dioxide particles produced by the process of the present invention be maintained at such a level when they are transferred to the second reaction zone that the tetrahalide and oxidizing gas introduced into the second reaction zone react rapidly without the necessity of supplying additional heat to this zone. For this purpose the effluent gases and titanium dioxide particles from the present process should be at a temperature of at least 600° C., and preferably at least 800° C., when introduced into the second reaction zone.

Where the vapor phase oxidation of a titanium tetrahalide is carried out according to the present process in a fluidized bed it has been found that the accretion of titanium dioxide on the bed particles is generally reduced by the presence of thorium.

A further advantage of the present invention is that it makes possible the production of a radioactive pigment, the common forms of thorium being radioactive.

*Example 1*

A 3″ silica tube was set up having a silica plate fused across the lower end through which protruded two tubes for the introduction of reactants. The silica tube was surrounded by an electric furnace. Titanium dioxide particles of a size range −44 +72 B.S.S. were slurried with an aqueous solution of thorium tetrachloride containing sufficient of the latter compound to give a concentration of 0.5%, by weight, of thorium tetrachloride on the titanium dioxide particles. The slurry was then dried while being stirred and sufficient of the treated particles were placed in the silica tube to give a static bed height of 6″.

The electric furnace was then switched on and the bed was fluidized with nitrogen. When the temperature of the bed reached 1050° C. the flow of nitrogen was stopped and oxygen at a rate of 18 litres per minute (at N.T.P.) was introduced through one tube and titanium tetrachloride vapor was introduced through the other tube at a rate equivalent to 55 ml. of liquid titanium tetrachloride per minute. The oxygen stream contained sufficient aluminum trichloride vapor to give 3% of alumina, based upon the weight of titanium dioxide produced, and the titanium tetrachloride stream contained sufficient silicon tetrachloride vapor to give 0.25% of silica, based upon the weight of titanium dioxide produced.

The experiment was continued for 30 minutes. The titanium dioxide produced was collected. The median weight crystal size of the product was estimated from a photograph obtained by means of an electron microscope and the Standard Deviation was also estimated.

The Standard Deviation of the crystal size is calculated from the curve obtained when the particle size of the product (in microns) is plotted against the weight percentage of the product which is less than a given particle size. The former value is expressed on a logarithmic scale and the latter value on a probability scale. The Standard Deviation is taken as the ratio between the particle size 84% and that at 50%.

*Example 2*

A similar experiment to that described in Example 1 was carried out wherein the bed material was slurried with sufficient of the aqueous solution of thorium tetrachloride to produce a concentration of 1% of thorium tetrachloride, by weight, on the bed particles.

*Example 3*

This was a control experiment not using the process of the invention. It was similar to that described in Examples 1 and 2 except in that the bed material contained no thorium tetrachloride.

The results obtained in Examples 1, 2 and 3 are given in the table below.

| Example No. | Concentration of thorium tetrachloride in bed material (percent) | Median weight crystal size (micron) | Standard Deviation | Amount of titanium dioxide produced retained on the bed particles (percent) |
| --- | --- | --- | --- | --- |
| 1 | 0.5 | 0.14 | 1.49 | 31 |
| 2 | 1.0 | 0.115 | 1.51 | 28 |
| 3 | Nil | 0.26 | 1.48 | 40 |

*Example 4*

The process described in Example 1 was repeated but in addition further quantities of titanium tetrachloride and oxygen were passed into the reactor by means of two injectors which were introduced through the top of the reactor and which projected into the space above the fluidized bed. Each injector consisted of a silica pipe of 6 mm. internal diameter sealed at the bottom and having two 4 mm. diameter holes in the side so positioned that the holes were 15 inches and 24 inches respectively above the base of the silica tube. One injector was connected to a source of titanium tetrachloride vapor and the other to a source of oxygen.

Titanium tetrachloride vapor preheated to 200° C., was passed into one injector at a rate equivalent to 110 ml.

per minute of liquid titanium tetrachloride and oxygen was passed into the other injector at a rate of 36 litres per minute (estimated at N.T.P.). The total flow of titanium tetrachloride into the reactor, therefore, was 165 ml. per minute (as liquid titanium tetrachloride) and the total flow of oxygen was 54 litres per minute.

The titanium dioxide entrained in the effluent gases had excellent pigmentary properties with a tinting strength of 1720 (on the Reynolds' scale); a rutile content of 99.2% and a mean crystal size of 0.22 micron. The Standard Deviation was 1.35.

The amount of titanium dioxide retained on the bed particles was 12.3% of the total weight of titanium dioxide theoretically derived from the titanium tetrachloride supplied to the reactor.

*Example 5*

The beta-activity of the product of the invention was measured with a Geiger counter by taking a two gram sample of the product which was approximately 14 months old, compressing the material into a disc 16 mms. in diameter and placing the disc thus formed close to the end window of the Geiger counter of similar diameter. The activity was 43 counts per minute. Allowance was made in this experiment for counts due to background radiation.

What is claimed is:

1. A process for producing titanium dioxide particles which comprises reacting in the vapor phase at least one member of the group consisting of titanium tetrachloride, titanium tetrabromide, and titanium tetraiodide with an oxidizing gas at 800 to 1400° C. in the presence of a thorium source, said source being present in an amount sufficient to provide a theoretical concentration of 0.001 to 10 percent by weight thorium in the titanium dioxide produced, basis the weight of the titanium dioxide.

2. The process of claim 1 wherein the thorium source is present in an amount sufficient to provide a theoretical concentration of 0.01 to 1.0 percent by weight thorium in the titanium dioxide produced, basis the weight of the titanium dioxide.

3. A process for producing titanium dioxide particles which comprises reacting in the vapor phase at least one member of the group consisting of titanium tetrachloride, titanium tetrabromide, and titanium tetraiodide with an oxidizing gas at 800° C. to 1400° C. in the presence of a thorium source, said source being a member selected from the group consisting of sulfates, phosphates, carbonates, nitrates, oxalates, oxide, hydroxide, sulfide and platinocyanide of thorium and present in an amount sufficient to provide a theoretical concentration of 0.001 to 10 percent by weight thorium in the titanium oxide produced, basis the weight of the titanium dioxide.

4. A process for producing titanuim dioxide particles which comprises reacting in the vapor phase titanium tetrachloride with an oxidizing gas at 800° C. to 1400° C. in the presence of an amount of thorium tetrachloride sufficient to provide a theoretical concentration of 0.01 to 1.0 percent by weight thorium in the titanium oxide produced, basis the weight of the titanium dioxide.

5. In a process for producing titanium dioxide wherein at least one member of the group consisting of titanium tetrachloride, titanium tetrabromide, and titanium tetraiodide is reacted in the vapor phase with an oxidizing gas in a fluidized bed of particulate material at 800° C. to 1400° C., the improvement which comprises providing a thorium source in the bed in an amount sufficient to provide a theoretical concentration of about .001 to 10 percent by weight thorium in the titanium dioxide produced, basis the weight of the titanium dioxide.

6. The process of claim 5 wherein the thorium source is selected from the group consisting of sulfates, phosphates, carbonates, nitrates, oxalates, oxide, hydroxide, sulfide, and platinocyanide of thorium.

7. The process of claim 5 wherein the thorium source is present in an amount sufficient to provide a theoretical concentration of about 0.01 to 1.0 percent by weight thorium in the titanium dioxide produced, basis the weight of the titanium dioxide.

8. A process for producing pigmentary titanium dioxide by the vapor phase oxidation of at least one titanium tetrahalide member of the group consisting of titanium tetrachloride, titanium tetrabromide, and titanium tetraiodide which comprises:
   (a) reacting at least one titanium tetrahalide member with an oxidizing gas in a first reaction zone at 800° C. to 1400° C. in the presence of a thorium source to produce titanium oxide particles, said source being present in an amount sufficient to provide a theoretical concentration of 0.001 to 10 percent by weight thorium in the titanium dioxide produced, basis the weight of the titanium dioxide;
   (b) withdrawing effluent gases having a temperature of at least 800° C. and containing entrained titanium dioxide particles from said first zone;
   (c) flowing the effluent and entrained titanium dioxide into a second reaction zone;
   (d) introducing at least two additions of oxidizing gas and the titanium tetrahalide member into the second zone;
   (e) withdrawing pigmentary titanium dioxide from the second zone.

9. The process of claim 8 wherein the thorium source is present in an amount sufficient to provide a theoretical concentration of about 0.01 to 1.0 percent by weight thorium in the titanium dioxide produced, basis the weight of the titanium dioxide.

10. The process of claim 8 wherein the first zone comprises a fluidized bed of particulate material and the thorium source is thorium tetrachloride.

References Cited by the Examiner

UNITED STATES PATENTS

| | | | |
|---|---|---|---|
| 2,026,862 | 1/1936 | Blumenfeld | 106—300 |
| 2,314,699 | 3/1943 | Hale | 252—301.1 X |
| 2,347,496 | 4/1944 | Muskat et al. | 23—202 |
| 2,760,846 | 8/1956 | Richmond et al. | 23—202 |
| 2,828,187 | 3/1958 | Evans | 23—202 |
| 2,980,509 | 4/1961 | Frey | 106—300 |
| 3,091,592 | 5/1963 | Fitch et al. | 252—301.1 |
| 3,150,099 | 9/1964 | Pons | 252—301.1 |

CARL D. QUARFORTH, *Primary Examiner.*

REUBEN EPSTEIN, *Examiner.*